United States Patent
Wei et al.

(10) Patent No.: US 10,148,370 B2
(45) Date of Patent: Dec. 4, 2018

(54) INTERFERENCE MEASURING METHOD AND INTERFERENCE MEASURING APPARATUS

(71) Applicant: Beijing Zhigu Rui Tuo Tech Co., Ltd, Beijing (CN)

(72) Inventors: Na Wei, Beijing (CN); Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/167,809

(22) Filed: May 27, 2016

(65) Prior Publication Data

US 2016/0352443 A1 Dec. 1, 2016

(30) Foreign Application Priority Data

May 29, 2015 (CN) .......................... 2015 1 0289739

(51) Int. Cl.
*H04B 17/345* (2015.01)
*H04L 5/00* (2006.01)
(Continued)

(52) U.S. Cl.
CPC ......... *H04B 17/345* (2015.01); *H04B 7/0617* (2013.01); *H04B 17/373* (2015.01);
(Continued)

(58) Field of Classification Search
CPC .... H04B 1/7097; H04B 17/24; H04B 17/345; H04B 2001/7154; H04B 2001/7072;
(Continued)

(56) References Cited

U.S. PATENT DOCUMENTS 9,319,124 B2 4/2016 Seol et al.
9,319,931 B2 * 4/2016 Lim .................. H04W 72/085
(Continued)

FOREIGN PATENT DOCUMENTS

CN 104113832 A 10/2014
CN 104244392 A 12/2014
(Continued)

OTHER PUBLICATIONS

Fodor, et al. "A Distributed Power Control Scheme for Cellular Network Assisted D2D Communications", 2011 IEEE Global Telecommunications Conference (GLOBECOM 2011). Dec. 2011. 6 pages.
(Continued)

*Primary Examiner* — Brian D Nguyen
*Assistant Examiner* — Roberta A Shand
(74) *Attorney, Agent, or Firm* — Amin, Turocy & Watson, LLP (57) ABSTRACT

Interference measurement is provided. A method comprises: determining pilot channel resource configured to send at least one directional pilot signal associated with directional device-to-device communications, and determining, at least according to a received state of a pilot signal on the determined pilot channel resource, interference caused by a signal associated with directional device-to-device communications in the pilot channel resource. Accordingly, interference related to directional D2D communications can be measured more accurately according to a directional pilot signal related to the directional D2D communications, thereby providing a basis for more effectively implementing the directional D2D communications.

20 Claims, 3 Drawing Sheets

(51) Int. Cl.
*H04W 76/14* (2018.01)
*H04W 52/24* (2009.01)
*H04W 52/38* (2009.01)
*H04B 17/373* (2015.01)
*H04B 7/06* (2006.01)
*H04B 17/318* (2015.01)

(52) U.S. Cl.
CPC .......... *H04L 5/0032* (2013.01); *H04L 5/0048* (2013.01); *H04L 5/0094* (2013.01); *H04W 52/24* (2013.01); *H04W 52/383* (2013.01); *H04W 76/14* (2018.02); *H04B 17/318* (2015.01); *H04L 5/0023* (2013.01); *H04W 52/243* (2013.01); *H04W 52/245* (2013.01)

(58) Field of Classification Search
CPC . H04B 17/373; H04B 17/318; H04W 72/082; H04W 76/023; H04W 52/24; H04W 52/244; H04W 28/0236
See application file for complete search history.

(56) References Cited

U.S. PATENT DOCUMENTS

| | | | |
|---|---|---|---|
| 9,781,731 | B2 | 10/2017 | Chen et al. |
| 9,820,287 | B2 | 11/2017 | Fujishiro et al. |
| 2007/0082692 | A1* | 4/2007 | Tirkkonen ............ H04L 5/0023 455/522 |
| 2007/0287384 | A1 | 12/2007 | Sadri et al. |
| 2009/0015478 | A1 | 1/2009 | Li et al. |
| 2009/0019150 | A1 | 1/2009 | Li et al. |
| 2011/0103317 | A1* | 5/2011 | Ribeiro ................ H04W 28/16 370/329 |
| 2013/0078991 | A1* | 3/2013 | Nam ...................... H04B 7/024 455/423 |
| 2013/0208587 | A1 | 8/2013 | Bala et al. |
| 2014/0153390 | A1* | 6/2014 | Ishii ................... H04W 76/023 370/230 |
| 2014/0219095 | A1 | 8/2014 | Lim |
| 2014/0235287 | A1 | 8/2014 | Maltsev et al. |
| 2014/0274088 | A1* | 9/2014 | Talwar ................ H04J 11/0023 455/452.1 |
| 2014/0321367 | A1 | 10/2014 | Marupaduga et al. |
| 2015/0049736 | A1 | 2/2015 | Liu et al. |
| 2015/0119088 | A1* | 4/2015 | Lee ...................... H04W 68/02 455/458 |
| 2015/0222345 | A1 | 8/2015 | Chapman et al. |
| 2015/0288427 | A1 | 10/2015 | Wang et al. |
| 2015/0373730 | A1 | 12/2015 | Fujishiro et al. |
| 2015/0382290 | A1 | 12/2015 | Yaacoub |
| 2016/0183286 | A1* | 6/2016 | Park ..................... H04W 72/02 370/329 |
| 2016/0270106 | A1 | 9/2016 | Zhou et al. |
| 2016/0352484 | A1 | 12/2016 | Wei et al. |
| 2016/0352485 | A1 | 12/2016 | Wei et al. |
| 2017/0041974 | A1 | 2/2017 | Liao et al. |

FOREIGN PATENT DOCUMENTS

| | | |
|---|---|---|
| CN | 104270712 A | 1/2015 |
| CN | 104284407 A | 1/2015 |
| CN | 104301984 A | 1/2015 |
| CN | 104488332 A | 4/2015 |

OTHER PUBLICATIONS

Yu, et al. "On the Performance of Device-to-Device Underlay Communication with Simple Power Control", IEEE 69th Vehicular Technology Conference, 2009. VTC Spring 2009. Apr. 2009. 5 pages.

Xing, et al. "The investigation of power control schemes for a device-to-device communication integrated into OFDMA cellular system", 2010 IEEE 21st International Symposium on Personal, Indoor and Mobile Radio Communications, Sep. 2010. 6 pages.

Office Action dated Jan. 18, 2018 for U.S. Appl. No. 15/166,229, 34 pages.

Office Action dated Apr. 6, 2018 for U.S. Appl. No. 15/166,257, 44 pages.

Office Action dated Mar. 8, 2018 for U.S. Appl. No. 15/166,240, 24 pages.

Office Action dated May 31, 2018 for U.S. Appl. No. 15/166,229, 31 pages.

Office Action dated May 25, 2018 for U.S. Appl. No. 15/166,252, 48 pages.

Office Action dated Oct. 11, 2018 for U.S. Appl. No. 15/166,240, 27 pages.

Office Action dated Oct. 23, 2018 for U.S. Appl. No. 15/166,252, 24 pages.

Notice of Allowance dated Sep. 24, 2018 for U.S. Appl. No. 15/166,229, 25 pages.

* cited by examiner

INTERFERENCE MEASURING METHOD AND INTERFERENCE MEASURING APPARATUS

RELATED APPLICATION

The present application claims the benefit of priority to Chinese Patent Application No. 201510289739.3, filed with the Chinese Patent Office on May 29, 2015, and entitled "INTERFERENCE MEASURING METHOD AND INTERFERENCE MEASURING APPARATUS", which application is hereby incorporated herein by reference in its entirety.

TECHNICAL FIELD

Embodiments of the application relate to the field of device to device (D2D) communications technology, and, for example, to an interference measuring method and an interference measuring apparatus.

BACKGROUND

D2D technology allows direct communications among terminal equipments, and thus can effectively increase the spectrum efficiency of a cellular communications system, reduce the transmit power of terminal equipments, and solve, to a certain extent, the problem of lack of spectrum resources of wireless communications systems. The D2D mode has been adopted by 3GPP Organization for Standardization, and used in Long Term Evolution (LTE) communications systems, and has a quite wide application prospect.

SUMMARY

On this account, one example, non-limiting object of one or more example embodiments of the application is to provide an interference measuring scheme that helps to better implement D2D communications.

In a first aspect, example embodiments of the application provide an interference measuring method, comprising:

determining pilot channel resource configured to send at least one directional pilot signal associated with directional device-to-device communications; and determining, at least according to a received state of the pilot signal on the determined pilot channel resource, interference caused by a signal associated with the directional device-to-device communications in the pilot channel resource.

In a second aspect, example embodiments of the application provide an interference measuring apparatus, comprising:

a first determining module, configured to determine pilot channel resource configured to send at least one directional pilot signal associated with directional device-to-device communications; and a second determining module, configured to determine, at least according to a received state of a pilot signal on the determined pilot channel resource, interference caused by a signal associated with the directional device-to-device communications in the pilot channel resource.

In a third aspect, example embodiments of the application provide a computer readable storage device, comprising at least one executable instruction, which, in response to execution, causes a system comprising a processor to perform operations, comprising:

determining pilot channel resource configured to send at least one directional pilot signal associated with directional device-to-device communications; and determining, at least according to a received state of the pilot signal on the determined pilot channel resource, interference caused by a signal associated with the directional device-to-device communications in the pilot channel resource.

In a fourth aspect, example embodiments of the application provide a device for interference measuring comprising a processor and memory, wherein the memory storing a computer executable instruction, the processor being connected with the memory via a communication bus, and when the device is operating, the processor executes or facilitates execution of the executable instructions stored by the memory:

determining pilot channel resource configured to send at least one directional pilot signal associated with directional device-to-device communications; and determining, at least according to a received state of the pilot signal on the determined pilot channel resource, interference caused by a signal associated with the directional device-to-device communications in the pilot channel resource.

By means of the method and the apparatus of example embodiments of the application, interference related to directional D2D communications can be measured more accurately according to a directional pilot signal related to the directional D2D communications, thereby providing a basis for more effectively implementing the directional D2D communications.

BRIEF DESCRIPTION OF THE DRAWINGS

FIGS. 2(*a*)-2(*e*) are example schematic structural diagrams of multiple examples of a D2D communications power control apparatus according to embodiments of the application.

DETAILED DESCRIPTION

The following further describes in detail example embodiments of the application with reference to the accompanying drawings and the corresponding description. The following embodiments are intended to describe the application, but are not intended to limit the scope of the application.

Persons skilled in the art may understand that terms such as "first", "second" or the like in the application are merely configured to distinguish among different devices, modules or parameters and the like, neither representing any specific technical meaning nor indicating a necessary logic sequence thereamong.

In example embodiments of the application, the term "directional device-to-device (D2D) communications" refers to D2D communications performing directional transmission over a D2D communications link. "Directional transmission" refers to implementing transmission of an RF signal in a particular direction (also referred to as directed transmission) by means of one or more directional transmitting antennas, comprising: transmission in a specific sector direction, or transmission to one receiving end by means of multiple paths (for example, implementing a directional transmitting by means of smart antenna beamforming technology).

In a D2D communications under partial cellular networks coverage scenarios, communications in the cellular networks will not be interfered when a dedicated channel is used for a D2D communications device. However, when the density of subscribers in a cell is relatively high, D2D communications may share or reuse frequency resources of cellular subscribers. Mutual interference may be caused when D2D communications and cellular communications reuse the same radio resources. With the development of terminal intelligentization, a growing number of terminal devices begin to have the capability of directional transmission, for example, directional transmission is implemented by a terminal equipped with a smart antenna by means of beamforming. Directional transmission may form spatial separation of a D2D signal from an uplink signal of co-frequency cellular subscribers (cellular subscribers reusing the same frequency to transmit signals with D2D subscribers), thereby reducing interference between D2D subscribers and their co-frequency cellular subscribers. Improvement of a total throughput of a system may be achieved by implementing a proper control of possible directional D2D transmission so as to reduce the interference caused by D2D subscribers on their co-frequency cellular subscribers. Based on possible directional transmission, embodiments of the application provide an interference measuring scheme that may help to better implement a control of D2D communications. A pilot signal is a known signal supplied by a transmitter device to a receiver device for a channel estimation or channel detection. In embodiments of the application, for possible directional D2D communications, a device (optionally, a sender device) involved in directional D2D communications is instructed to transmit an uplink directional pilot signal, to control D2D communications according to the directional pilot signal associated with directional D2D communications.

Figure 1:
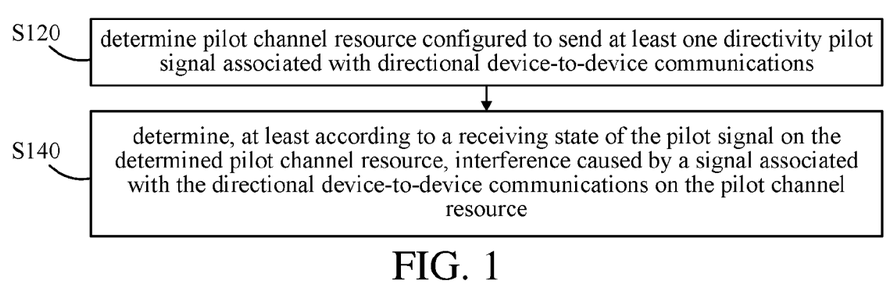
FIG. 1 is an example schematic flow diagram of an example of an interference measuring method according to an embodiment of the application.

FIG. 1 is a flowchart of an interference measuring method based on a directional pilot signal according to an embodiment of the application. The method may be executed by a base station (comprising the base station of a serving cell involved in the directional D2D communications, and further comprising any base station of neighboring cells), by a device of any party involved in the directional D2D communications, by a device of other subscribers not involved in the directional D2D communications, or by an independent apparatus. As shown in FIG. 1, the method comprises:

S120: determine pilot channel resource configured to send at least one directional pilot signal associated with directional device-to-device communications.

As mentioned above, the directional pilot signal refers to a pilot signal, transmitting in a specific direction, implemented by means of one or more directional transmitting antenna. The direction of the directional pilot signal is the same as the direction of corresponding D2D communications, i.e. as the data and signal transmitting direction for both parties involved in directional D2D communications. The direction related to the directional D2D communications to be implemented may be already determined and unique, for example, uniquely determined by the sender device according to the location of the receiver device, meanwhile the direction of the corresponding directional pilot signal is also unique. The directional D2D communications to be implemented may also have two or more expected candidate directions, and a proper direction may be determined according to communications performance and interference or the like in the candidate directions. Correspondingly, each of the expected candidate directions has a corresponding directional pilot signal. In other words, the at least one directional pilot signal comprises: at least one pilot signal in one direction, or at least one pilot signal in each one of multiple directions. In order to better implement the directional D2D communications, a directional pilot signal associated with the directional D2D communications exists in technical solutions of embodiments of the application. According to different roles of the apparatus executing the method in this embodiment, Step S120 may comprise:

S122: allocate the pilot channel resource configured to send at least one directional pilot signal associated with directional device-to-device communications.

Still as mentioned above, to each of the directional D2D communications to be implemented, one or more pilot channel resources configured to send one or more directional pilot signals may be allocated. The one or more pilot channel resources may be channel resources having been occupied by other cellular subscribers, or channel resources having been occupied by directional D2D communications in other directions, or idle channel resources not having been occupied by any subscriber. Or, S124: acquire information associated with the pilot channel resource. For example, information from a base station side and associated with allocation of the pilot channel resource is received.

After the allocated pilot channel resource is determined, the method of this embodiment further comprises:

S140: determine, at least according to a received state of the pilot signal in the determined pilot channel resource, interference caused by a signal associated with the directional device-to-device communications in the pilot channel resource.

According to allocation of the pilot channel resource, the pilot signal in the pilot channel resource may comprise at least one directional pilot signal sent in the pilot channel resource, and may further comprise a non-directional pilot signal, i.e., a pilot signal unrelated to the directional D2D communications. The received state refers to any information that can indicate received status of a pilot signal, preferably, comprising: the received strength of the pilot signal, etc. The pilot signal is a signal for monitoring/measuring. Interference in corresponding resource may be inferred according to received status of the pilot signal in the pilot channel resource. It should be explained that the interference is related to the directional D2D communications to be implemented, comprising measurement of interference caused by at least one directional pilot signal associated with the directional D2D communications to be implemented, and further comprising a prediction of possible interference caused by data signal related to the directional D2D communications to be implemented. In addition, the interference may refer to a description of an interference, comprising: a judgment for whether an interference could be caused of having been caused; interference level that can be calculated, alternatively, several interference levels may be set: strong interference, moderate interference, weak interference or the like; and other parameters associated with interference that can be determined, for example, signal strength.

In summary, by means of the method of this embodiment, interference related to directional D2D communications can be measured more accurately according to a directional pilot signal related to the directional D2D communications, thereby providing a basis for more effectively implementing the directional D2D communications.

By means of the method of this embodiment, interference within pilot channel resource may be determined by means of multiple indicators. In an example embodiment, the interference may be determined according to a received state of the base station of a serving cell involved in directional device-to-device communications. That is, Step S140 may comprise:

S141: determine a first received state of a pilot signal received, by the base station of a serving cell involved in the directional device-to-device communications, in the pilot channel resource.

According to different roles of the apparatus executing the method in this embodiment, in Step S141, the first received state may be determined by means of calculation or communication with an external device.

S142: determine the interference at least according to the first received state.

In another example embodiment, the interference may be determined according to a received state of at least one neighboring cell site involved in directional device-to-device communications. That is, Step S140 may further comprise:

S143: determine a second received state of a pilot signal received, by the base station of a neighboring cell involved in the directional device-to-device communications, in the pilot channel resource.

According to different roles of the apparatus executing the method in this embodiment, in Step S143, the second received state may be determined by means of calculation or communication with an external device.

S144: determine the interference at least according to the second received state.

In still another example embodiment, the interference may be determined according to a received state of the current cell site and at least one neighboring cell site involved in directional device-to-device communications. That is, Step S140 may further comprise:

S145: determine a first received state of a pilot signal received, by the base station of a serving cell involved in the directional device-to-device communications, in the pilot channel resource, and a second received state of a pilot signal received, by the base station of a neighboring cell involved in the directional device-to-device communications, in the pilot channel resource.

S146: determine the interference at least according to the first received state and the second received state.

Alternatively, the received state may comprise: a first received strength of the at least one directional pilot signal in the pilot channel resource, i.e., the received strength of the at least one directional pilot signal can be determined, and possible interference may be determined according to the received strength of the pilot signal. The first received state is a received strength of the at least one directional pilot signal received, by the base station of a serving cell involved in the directional device-to-device communications, in the pilot channel resource; and the second received state is a received strength of the at least one directional pilot signal received, by at least one base station of neighboring cells involved in the directional device-to-device communications, in the pilot channel resource. The directional pilot signal may be differentiated by base stations according to, for example, pilot configuration, or according to the direction of the directional pilot signal.

Correspondingly, in Step S142 or Step S144 or Step S146, the interference may be determined at least according to the first received strength and at least one preset strength threshold.

Specifically, at least one preset strength threshold or threshold range may be set according to experience or Quality of Service demands, and the existence of interference or level of interference can be determined according to a comparison between the first received strength and the at least one preset strength threshold. For example, it is determined that a strong interference will be caused by directional D2D communications associated with a directional pilot signal corresponding to the first received strength in corresponding channel resource if the first received strength is within a threshold range of the strong interference; and there is no interference if the first received strength is lower than the lower limit of interference intensity, etc.

Alternatively, the received state may further comprise: a first received strength of the at least one directional pilot signal in the pilot channel resource and a second received strength of a pilot signal unrelated to the directional device-to-device communications.

In this case, the interference may be determined at least according to the first received strength and the second received strength in Step S142 or Step S144 or Step S146. That is, the interference is determined based on a comprehensive consideration of interference of the directional D2D communications on the base station of the serving cell and the base station of a neighboring cell.

It should be explained that according to different roles of the apparatus executing the method in this embodiment, the first received strength and/or the second received strength may be determined by the apparatus itself or acquired by means of communication with an external device.

In addition, in the case where the apparatus executing the method in this embodiment is a device of any party involved in the directional D2D communications, the method may further comprise:

S130: send at least one directional pilot signal at least in the determined pilot channel resource.

Persons skilled in the art may understand that in the foregoing method according to an example embodiment of the application, a sequence number of each step does not mean an execution sequence, and the execution sequence of each step shall be determined by its function and an internal logic, and shall not impose a limit on the implementation process of the example embodiment of the application.

In addition, embodiments of the application further provides a computer-readable medium, comprising a computer-readable instruction configured to conduct, when it is implemented, the following operation: an operation configured to implement steps of the method in the example embodiment as shown in FIG. 1.

Figure 2A:
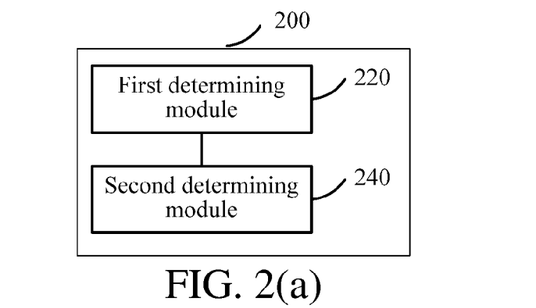

The application further provides an interference measuring apparatus. FIG. 2(*a*) is a structural diagram of an exemplary interference measuring apparatus. The apparatus may belong to a base station (comprising the base station of a serving cell involved in the directional D2D communications, and further comprising any base station of neighboring cells), a device of any party involved in the directional D2D communications, a device of other subscribers not involved in the directional D2D communications, or an independent apparatus. As shown in FIG. 2(*a*), the apparatus 200 comprises:

a first determining module 220, configured to determine pilot channel resource configured to send at least one directional pilot signal associated with directional device-to-device communications.

As mentioned above, the directional pilot signal refers to a pilot signal, transmitting in a specific direction, implemented by means of one or more directional transmitting antenna. The direction of the directional pilot signal is the same as the direction of corresponding D2D communications, i.e., as the data and signal transmitting direction for both parties involved in directional D2D communications. The direction related to the directional D2D communications to be implemented may be already determined and unique, for example, uniquely determined by the sender device according to the location of the receiver device, meanwhile the direction of the corresponding directional pilot signal is also unique. The directional D2D communications to be implemented may also have two or more expected candidate directions, and a proper direction may be determined according to communications performance and interference or the like in the candidate directions. Correspondingly, each of the expected candidate directions has a corresponding directional pilot signal. In other words, the at least one directional pilot signal comprises: at least one pilot signal in one direction, or at least one pilot signal in each one of multiple directions. In order to better implement the directional D2D communications, a directional pilot signal associated with the directional D2D communications exists in technical solutions of embodiments of the application. According to different roles of the apparatus in this embodiment, the first determining module 120 is configured to allocate pilot channel resource configured to send at least one directional pilot signal associated with directional device-to-device communications.

Still as mentioned above, to each of the directional D2D communications to be implemented, one or more pilot channel resources configured to send one or more directional pilot signals may be allocated. The one or more pilot channel resources may be channel resources having been occupied by other cellular subscribers, or channel resources having been occupied by directional D2D communications in other directions, or idle channel resources not having been occupied by any subscriber. Or, the first determining module 220 may acquire information associated with the pilot channel resource. For example, the first determining module 220 receives information from a base station side and is associated with allocation of the pilot channel resource.

The apparatus 200 of this embodiment further comprises:

a second determining module 240, configured to determine, at least according to a received state of a pilot signal in the determined pilot channel resource, interference caused by a signal associated with the directional device-to-device communications in the pilot channel resource after the first determining module 220 has determined the allocated pilot channel resource.

According to allocation of the pilot channel resource, the pilot signal in the pilot channel resource may comprise at least one directional pilot signal sent in the pilot channel resource, and may further comprise a non-directional pilot signal, i.e., a pilot signal unrelated to the directional D2D communications. The received state refers to any information that can indicate received status of a pilot signal, preferably, comprising: the received strength of the pilot signal, etc. The pilot signal is a signal for monitoring/measuring. Interference in corresponding resource may be inferred according to received status of the pilot signal in the pilot channel resource. It should be explained that the interference is related to the directional D2D communications to be implemented, comprising measurement of interference caused by at least one directional pilot signal associated with the directional D2D communications to be implemented, and further comprising a prediction of possible interference caused by data signal related to the directional D2D communications to be implemented. In addition, the interference may refer to a description of an interference, comprising: a judgment for whether an interference could be caused; interference level that can be calculated, alternatively, several interference levels may be set: strong interference, moderate interference, weak interference or the like; and other parameters associated with interference that can be determined, for example, signal strength.

In summary, by means of the apparatus of this embodiment, interference related to directional D2D communications can be measured more accurately according to a directional pilot signal related to the directional D2D communications, thereby providing a basis for more effectively controlling the directional D2D communications.

Figure 2B:
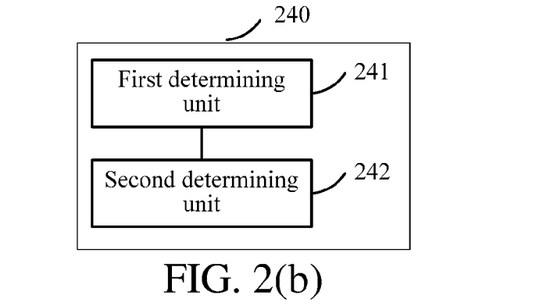

The apparatus of this embodiment may determine interference within pilot channel resource by means of multiple indicators. In an example embodiment, the interference may be determined according to a received state of the base station of a serving cell involved in directional device-to-device communications. That is, as shown in FIG. 2(*b*), the second determining module 240 may comprise:

a first determining unit 241, configured to determine a first received state of a pilot signal received, by the base station of a serving cell involved in the directional device-to-device communications, in the pilot channel resource.

According to different roles of the apparatus in this embodiment, the first determining unit 241 may determine the first received state by means of calculation or communication with an external device.

A second determining unit 242, configured to determine the interference at least according to the first received state.

Figure 2C:
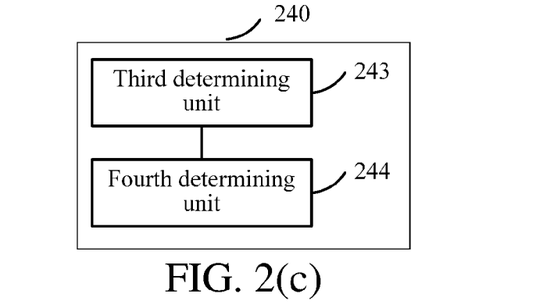

In another example embodiment, the interference may be determined according to a received state of at least one neighboring cell site involved in directional device-to-device communications. That is, as shown in FIG. 2(*c*), the second determining module 240 may further comprise:

a third determining unit 243, configured to determine a second received state of a pilot signal received, by the base station of a neighboring cell involved in the directional device-to-device communications, in the pilot channel resource.

According to different roles of a body executing the method in this embodiment, the third determining unit 243 may determine the second received state by means of calculation or communication with an external device.

A fourth determining unit 244, configured to determine the interference at least according to the second received state.

Figure 2D:
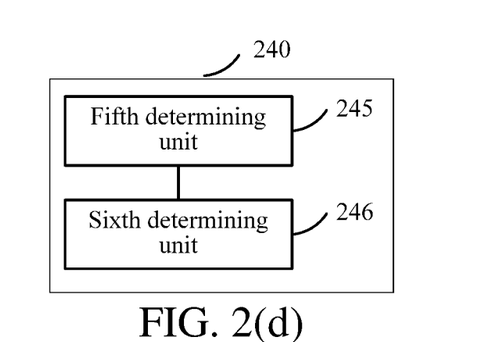

In still another example embodiment, the interference may be determined according to a received state of the current cell site and at least one neighboring cell site involved in directional device-to-device communications. That is, as shown in FIG. 2(*d*), the second determining module 240 may further comprise:

a fifth determining unit 245, configured to determine a first received state of a pilot signal received, by the base station of a serving cell involved in the directional device-to-device communications, in the pilot channel resource, and a second received state of a pilot signal received, by the base station of a neighboring cell involved in the directional device-to-device communications, in the pilot channel resource; and a sixth determining unit 246, configured to determine the interference at least according to the first received state and the second received state.

Alternatively, the received state may comprise: a first received strength of the at least one directional pilot signal in the pilot channel resource, i.e., the received strength of the at least one directional pilot signal can be determined, and possible interference may be determined according to the received strength of the pilot signal. The first received state is a received strength of the at least one directional pilot signal received, by the base station of a serving cell involved in the directional device-to-device communications, in the pilot channel resource; and the second received state is a received strength of the at least one directional pilot signal received, by at least one base station of neighboring cells involved in the directional device-to-device communications, in the pilot channel resource. The directional pilot signal may be differentiated by base stations according to, for example, pilot frequency configuration, or according to the direction of the directional pilot signal.

Correspondingly, the second determining module 242, the fourth determining unit 244 or the sixth determining unit 246 may determine the interference at least according to the first received strength and at least one preset strength threshold.

Specifically, at least one preset strength threshold or threshold range may be set according to experience or Quality of Service demands, and the existence of interference or level of interference can be determined according to a comparison between the first received strength and the at least one preset strength threshold. For example, it is determined that a strong interference will be caused by directional D2D communications associated with a directional pilot signal corresponding to the first received strength in corresponding channel resource if the first received strength is within a threshold range of the strong interference; and there is no interference if the first received strength is lower than the lower limit of interference intensity, etc.

Alternatively, the received state may further comprise: a first received strength of the at least one directional pilot signal in the pilot channel resource and a second received strength of a pilot signal unrelated to the directional device-to-device communications.

In this case, the second determining module 242, the fourth determining unit 244 or the sixth determining unit 246 may determine the interference at least according to the first received strength and the second received strength. That is, the interference is determined based on a comprehensive consideration of interference of the directional D2D communications on the base station of the serving cell and the base station of a neighboring cell.

It should be explained that according to different roles of the apparatus in this embodiment, the first received strength and/or the second received strength may also be determined by the apparatus itself or acquired by means of communication with an external device.

Figure 2E:
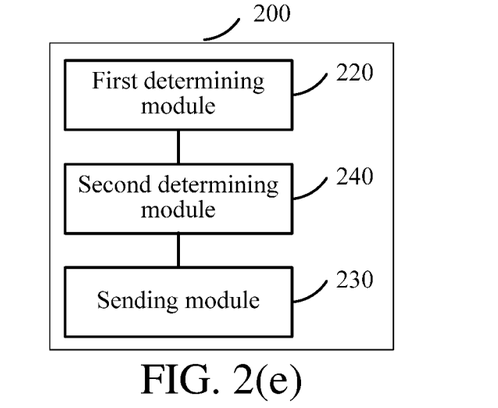

In addition, when the apparatus in this embodiment is a device of any party involved in the directional D2D communications, as shown in FIG. 2(*e*), the apparatus 200 may further comprise:

a sending module 230, configured to send at least one directional pilot signal at least in the determined pilot channel resource.

Figure 3:
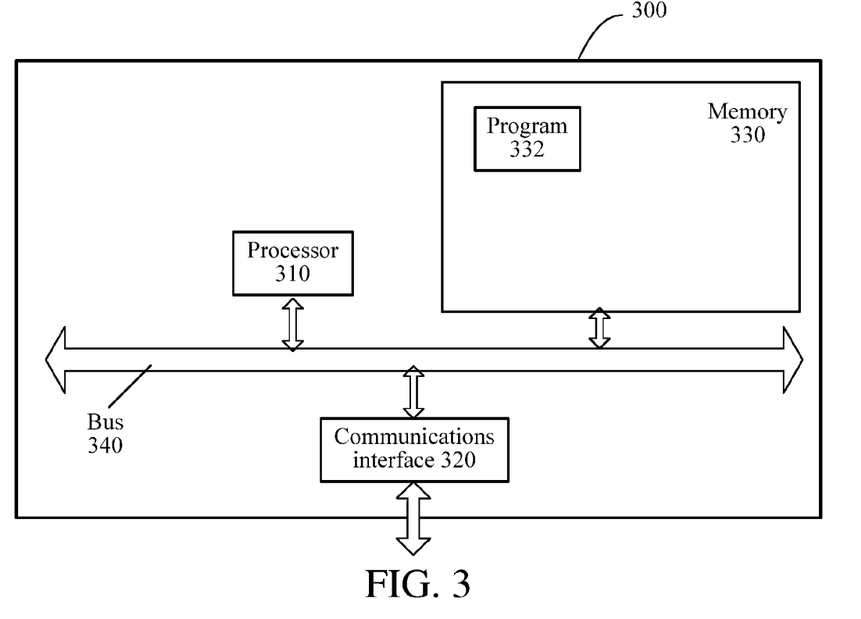
FIG. 3 is an example schematic structural diagram of another example of an interference measuring apparatus according to an embodiment of the application.

FIG. 3 is a schematic structural diagram of an interference measuring apparatus 300 according to an embodiment of the application. However, this concrete embodiment of the application does not limit an example embodiment of the interference measuring apparatus 300. As shown in FIG. 3, the interference measuring apparatus 300 may comprise:

a processor 310, a communications interface 320, a memory 330 and a communications bus 340, wherein:

communications among the processor 310, the communications interface 320 and the memory 330 are achieved by means of the communications bus 340.

The communications interface 320 is configured to communicate with a network element such as a client-side.

The processor 310 is configured to execute a program 332, and specifically implement relevant functions of the interference measuring apparatus in the apparatus embodiment in FIG. 1(*a*).

Specifically, the program 332 may comprise a program code, and the program code comprises a computer operating instruction.

The processor 310 may be a central processing unit (CPU), or an application specific integrated circuit (ASIC), or one or more integrated circuits configured to implement the embodiments of the application. The program 332 may specifically be configured to enable the interference measuring apparatus 300 to execute the following steps:

determining pilot channel resource configured to send at least one directional pilot signal associated with directional device-to-device communications; and determining, at least according to a received state of the pilot signal on the determined pilot channel resource, interference caused by a signal associated with the directional device-to-device communications in the pilot channel resource.

Example implementation of various steps in the program 332 may refer to corresponding description of corresponding steps and units in the foregoing embodiments, which is not repeated any more herein. Persons skilled in the art may clearly understand that for a convenient and concise description, a concrete work process of devices and modules described above may refer to a corresponding process description of the foregoing method embodiments, which is not repeated any more herein.

Persons skilled in the art may clearly understand that for a convenient and concise description, a concrete work process of devices and modules described above may refer to a corresponding process description of the foregoing apparatus embodiments, which is not repeated any more herein.

Although the theme described herein is provided in general context with reference to an operating system and execution of an application program in a computer system, those skilled in the art may realize that other implementations may be executed with reference to other types of program modules. Generally speaking, the program module comprises a routine for executing a specific task or realizing a specific abstract data type, a program, a component, a data structure, or other types of structures. Those skilled in the art may understand that the theme described herein may be practiced by means of other computer system configurations, comprising a handheld device, a multi-processor system, a microprocessor-based or programmable consumer electronics product, a small computer or a large computer or the like, or also be used in a distributed computing environment in which a task is executed by a remote processing device connected by means of a communications network. In a distributed computing environment, the program module may be disposed in local and remote memory storage devices.

Persons of ordinary skill in the art may realize that it is possible to implement, by electronic hardware or a combination of computer software and electronic hardware, steps of units and methods in various examples as described in embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the application.

The functions may be stored in a computer-readable storage medium if they are implemented in the form of software function units and are sold or used as independent products. On the basis of such an understanding, the technical solution of the application in essence or that part of contribution to the prior art or a part of the technical solution may be embodied in the form of software products, which may be stored in a storage medium, comprising some instructions to cause a computer device (a personal computer, a server, a network device or the like) to execute all or a part of steps of the method as recited in the embodiments of the application. The aforementioned computer-readable storage media comprises physically volatile and nonvolatile media, and movable and non-removable media, which are implemented by any means or technology for storing information such as a computer-readable instruction, a data structure, a program module or other data. The computer-readable storage media concretely comprise but are not limited to: a U-disk, a mobile hard disk, a read-only memory (ROM), a random access memory (RAM), an erasable programmable read only memory (EPROM), an electrically erasable programmable read-only memory (EEPROM), a flash memory or other solid state memory technologies, a CD-ROM, a digital versatile disk (DVD), an HD-DVD, a Blue-Ray memory device or other optical memory devices, a magnetic tape, a magnetic disk memory device or other magnetic memory devices, or any other computer accessible media that are configured to store required information.

The foregoing example embodiments are merely intended for describing the application, and are not restrictive of the application. Persons of ordinary skill in the art may make various variations and modifications without departing from the spirit and scope of the application. Therefore, all equivalent technical solutions also fall within the scope of the application. And the patent protection scope of the application shall be limited by the claims.

What is claimed is:

1. A method, comprising:
   determining, by a system comprising a processor, a pilot channel resource configured to send at least one directional pilot signal associated with directional device-to-device communications; and
   determining, at least according to a first received state of a first pilot signal of the at least one directional pilot signal on the pilot channel resource, an interference caused by a signal associated with the directional device-to-device communications in the pilot channel resource, wherein the determining the interference comprises:
   determining a second received state of a second pilot signal of the at least one directional pilot signal received, by a first base station device of a serving cell device involved in the directional device-to-device communications, in the pilot channel resource, and
   determining the interference at least according to the second received state, and
   determining, based on a measurement of the interference caused by the at least one directional pilot signal associated with the directional device-to-device communications, a prediction of possible interference caused by a data signal related to the directional device-to-device communications.

2. The method of claim 1, wherein the determining the interference further comprises:
   determining a third received state of a third pilot signal of the at least one directional pilot signal received, by a second base station device of a neighboring cell device involved in the directional device-to-device communications, in the pilot channel resource; and
   determining the interference at least according to the third received state.

3. The method of claim 1, wherein the determining the interference further comprises:
   determining a third received state of a third pilot signal of the at least one directional pilot signal received, by a second base station device of a neighboring cell device involved in the directional device-to-device communications, in the pilot channel resource; and
   determining the interference at least according to the second received state and the third received state.

4. The method of claim 1, wherein the first received state comprises a first received strength of the first pilot signal of the at least one directional pilot signal in the pilot channel resource, and
   wherein the determining the interference comprises determining the interference at least according to the first received strength and at least one preset strength threshold.

5. The method of claim 1, wherein the first received state comprises a first received strength of the first pilot signal of the at least one directional pilot signal in the pilot channel resource and a second received strength of a fourth pilot signal unrelated to the directional device-to-device communications, and
   wherein the determining the interference comprises determining the interference at least according to the first received strength and the second received strength.

6. The method of claim 1, wherein the determining the pilot channel resource comprises allocating the pilot channel resource.

7. The method of claim 1, wherein the determining the pilot channel resource comprises receiving information associated with the pilot channel resource.

8. The method of claim 7, further comprising sending the at least one directional pilot signal at least on the pilot channel resource.

9. A system, comprising:
   a processor; and
   a memory that stores executable instructions that, when executed by the processor, facilitate performance of operations, comprising:
   determining a pilot channel resource configured to send a directional pilot signal associated with a directional device-to-device communication; and
   determining, at least according to a first received state of a first pilot signal on the pilot channel resource, interference information related to interference caused by a signal associated with the directional device-to-device communication in the pilot channel resource, wherein the determining the interference information comprises:
   determining a second received state of a second pilot signal, wherein the second pilot signal is received in the pilot channel resource via a first base station device of a serving cell device involved in the directional device-to-device communication, and determining the interference information at least according to the second received state, and
wherein the interference information comprises:
a measurement of the interference caused by the directional pilot signal associated with the directional device-to-device communications, and
prediction information indicative of other possible interference caused by a data signal related to the directional device-to-device communications.

10. The system of claim 9, wherein the determining the interference information further comprises determining a third received state of a third pilot signal, wherein the third pilot signal is received in the pilot channel resource via a second base station device of a neighboring cell device involved in the directional device-to-device communication; and
the determining the interference information is further at least according to the third received state.

11. The system of claim 9, wherein the determining the interference information is at least according to the second received state and a third received state corresponding to a third pilot signal contributed to the pilot channel resource by a second base station device of a neighboring cell device involved in the directional device-to-device communication.

12. The system of claim 9, wherein the first received state comprises a first received strength of the directional pilot signal in the pilot channel resource, and wherein the second determining module is configured to determine the interference at least according to the first received strength and a preset strength threshold.

13. The system of claim 9, wherein the first received state comprises a first received strength of the directional pilot signal in the pilot channel resource and a second received strength of a third pilot signal unrelated to the directional device-to-device communications, and wherein the determining the interference information is at least according to the first received strength and the second received strength.

14. The system of claim 9, wherein the operations further comprise allocating the pilot channel resource.

15. The system of claim 9, wherein the operations further comprise receiving pilot channel resource information associated with the pilot channel resource.

16. The system of claim 15, wherein the operations further comprise sending the directional pilot signal at least on the pilot channel resource.

17. A non-transitory computer readable storage device, comprising at least one executable instruction, which, in response to execution, causes a system comprising a processor to perform operations, comprising:
determining a pilot channel resource configured to send at least one directional pilot signal associated with directional device-to-device communications; and
determining, at least according to a received state of the at least one directional pilot signal on the pilot channel resource, an interference caused by a signal associated with the directional device-to-device communications in the pilot channel resource, wherein the received state is a first received state, and wherein the determining the interference comprises:
determining a second received state of a first pilot signal received, by a first base station device of a serving cell device involved in the directional device-to-device communications, in the pilot channel resource to facilitate determining the interference at least according to the second received state, and
determining, based on a measurement of the interference, prediction information corresponding to other possible interference caused by a data signal related to the directional device-to-device communications.

18. The computer readable storage device of claim 17, wherein the determining the interference further comprises determining a third received state of a second pilot signal received, by a second base station device of a neighboring cell device involved in the directional device-to-device communications, in the pilot channel resource, and wherein the determining the interference is based on the second received state and the third received state.

19. A device comprising a processor and memory, wherein the memory stores executable instructions, the processor being connected with the memory via a communication bus, and when the device is operating, the processor executes or facilitates execution of the executable instructions stored by the memory to perform operations, comprising:
determining a pilot channel resource configured to send a directional pilot signal associated with a directional device-to-device communication; and
determining, at least according to a received state of the directional pilot signal on the pilot channel resource, an interference caused by a signal associated with the directional device-to-device communication in the pilot channel resource, wherein the received state is a first received state, and wherein determining the interference comprises:
determining a second received state of a first pilot signal received, by a first base station device of a serving cell device involved in the directional device-to-device communications, in the pilot channel resource; and
determining the interference at least according to the second received state; and
predicting other possible interference caused by a data signal related to the directional device-to-device communications based on a measurement of the interference.

20. The device of claim 19, wherein the determining the interference further comprises determining a third received state of a second pilot signal received, by a second base station device of a neighboring cell device involved in the directional device-to-device communications, in the pilot channel resource, and wherein the determining the interference is based on the second received state and the third received state.

* * * * *